United States Patent

Kreidermacher et al.

[15] 3,641,331

[45] Feb. 8, 1972

[54] APPARATUS FOR PERFORMING ARITHMETIC OPERATIONS ON NUMBERS USING A MULTIPLE GENERATING AND STORAGE TECHNIQUE

[72] Inventors: Leonard L. Kreidermacher, Acton; David M. Hudson, Holliston, both of Mass.

[73] Assignee: Honeywell Inc., Minneapolis, Minn.

[22] Filed: Nov. 12, 1969

[21] Appl. No.: 875,909

[52] U.S. Cl. ...............................235/159, 235/156, 235/160

[51] Int. Cl. ........................................G06f 7/39, G06f 7/38

[58] Field of Search .................................235/156, 159, 160

[56] References Cited

UNITED STATES PATENTS

| | | | |
|---|---|---|---|
| 3,234,366 | 2/1966 | Davis et al. | 235/159 |
| 3,278,731 | 10/1966 | Yen | 235/160 |
| 3,293,419 | 12/1966 | Daly | 235/159 |
| 3,372,269 | 3/1968 | MacSorley et al. | 235/160 |

*Primary Examiner*—Malcolm A. Morrison
*Assistant Examiner*—James F. Gottman
*Attorney*—Fred Jacob, Leo Stanger, Lester Hecht and Faith Driscoll

[57] ABSTRACT

Apparatus for performing arithmetical operations with operands in binary coded decimal form includes means for initially generating and storing at least the first half of the multiples of an operand and during the arithmetic operation, generating a result by performing a selectable operation of either directly transferring or complementing selected prestored multiples.

13 Claims, 5 Drawing Figures

INVENTORS
LEONARD L. KREIDERMACHER
DAVID M. HUDSON
BY Faith F. Driscoll
ATTORNEY INVENTORS
LEONARD L. KREIDERMACHER
DAVID M. HUDSON
BY Faith F. Driscoll
ATTORNEY INVENTORS
LEONARD L. KREIDERMACHER
DAVID M. HUDSON
BY Faith F. Driscoll
ATTORNEY INVENTORS
LEONARD L. KREIDERMACHER
DAVID M. HUDSON
BY Faith F. Driscoll
ATTORNEY

APPARATUS FOR PERFORMING ARITHMETIC OPERATIONS ON NUMBERS USING A MULTIPLE GENERATING AND STORAGE TECHNIQUE

BACKGROUND OF THE INVENTION

The present invention relates to apparatus for performing mathematical computation on numbers represented in binary coded form; and more particularly, to apparatus for performing decimal operations using a multiple storage and selection technique.

The prior art discloses numerous ways for performing mathematical operations which involve initially generating a small percentage of the total number of an operand, storing these, and then generating the remaining multiples by adding selected combinations of prestored multiples. While this reduced the number of multiples generated and minimized storage cost, it increased considerably the time for generating multiples during the mathematical process.

U.S. Pat. No. 3,293,419 assigned to the assignee of the present invention, discloses apparatus which decreased the time required to (e.g., multiples by having the apparatus perform a combination of operations on a single multiple. Specifically, the patented apparatus generates and stores the multiples 1, 3, 5 and 7 of an operand and during the particular operation forms by performing selected operations of straight or shifted readout, and complementing or noncomplementing selected prestored multiples. While the apparatus of the patent eliminated the need for combining multiples, it still required combinations of operations to be performed on selected multiples. Furthermore, in order to perform combinations of operations, it was necessary to have the apparatus include specialized wired in hardware functions e.g. shift) and complex selection logic in addition to multiple shift and transfer paths to accomplish the above-mentioned combinations of operations.

Accordingly, it is a primary object of the present invention to provide an improved apparatus including means for generating and storing selective multiples of an operand and subsequently, generate all the multiples of the operand as required by the operation within a minimum period of time and with a minimum of hardware.

It is a further object of the present invention to provide improved apparatus which is highly modular in construction and which generates all multiples of an operand during a particular arithmetic operation within a minimum amount of time.

It is a still more limited object of the present invention to provide improved apparatus for performing decimal multiplication which stores a number of multiples selected to enable the generation of all remaining multiples required by performing a single operation on prestored multiples.

SUMMARY OF THE INVENTION

The present invention provides improved apparatus by generating and storing a predetermined number of multiples of the operand wherein the multiples allow each of the multiples required during the arithmetic operation to be generated by performing a single operation upon a selected prestored multiple. In the present invention, each multiple is generated either by directly transferring or by complementing the signal representation of a selected prestored multiple.

While the apparatus of the present invention may find use in performing arithmetic operations upon numbers in hexadecimal code, its particular novelty lies in performing arithmetic operations involving decimal numbers. In more particular terms, the invention contemplates apparatus for initially generating and storing at least the first half of the total number of multiples (i.e., multiples 0 through 5) of an operand and means for generating the remaining multiples 6 through 10 by taking the 10's complement of selected prestored multiples.

In the context of decimal multiplication, the present invention realizes improved efficiency by decreasing the time required for generating the multiples of the multiplicand during the multiplication operation by reducing generating process in all instances to a single operation. Because the generating process normally constitutes a small percentage of the total time for performing the multiplication, the time expended in generating additional multiples for prestorage is small in comparison to the time required for generating the multiples of the multiplicand during multiplication operation. Hence, reducing this last-mentioned generation process for all multiples to either a single transfer or complementing operation, minimizes the overall time period for executing the multiplication operation. Moreover, since a single operation is required for generating all multiples, the system hardware is reduced considerably.

The above and other objects of the present invention are achieved in several illustrative embodiments described hereinafter. The novel features which are believed to be characteristic of the invention, both as to its organization and method of operation, together with further objects and advantages thereof will be better understood from the following description considered in connection with the accompanying drawings. It is to be expressly understood, however, that each of the drawings is for the purpose of illustration and description only and is not intended as a definition of the limits of the invention.

DESCRIPTION OF THE PREFERRED EMBODIMENT

Figures 1, 1A:
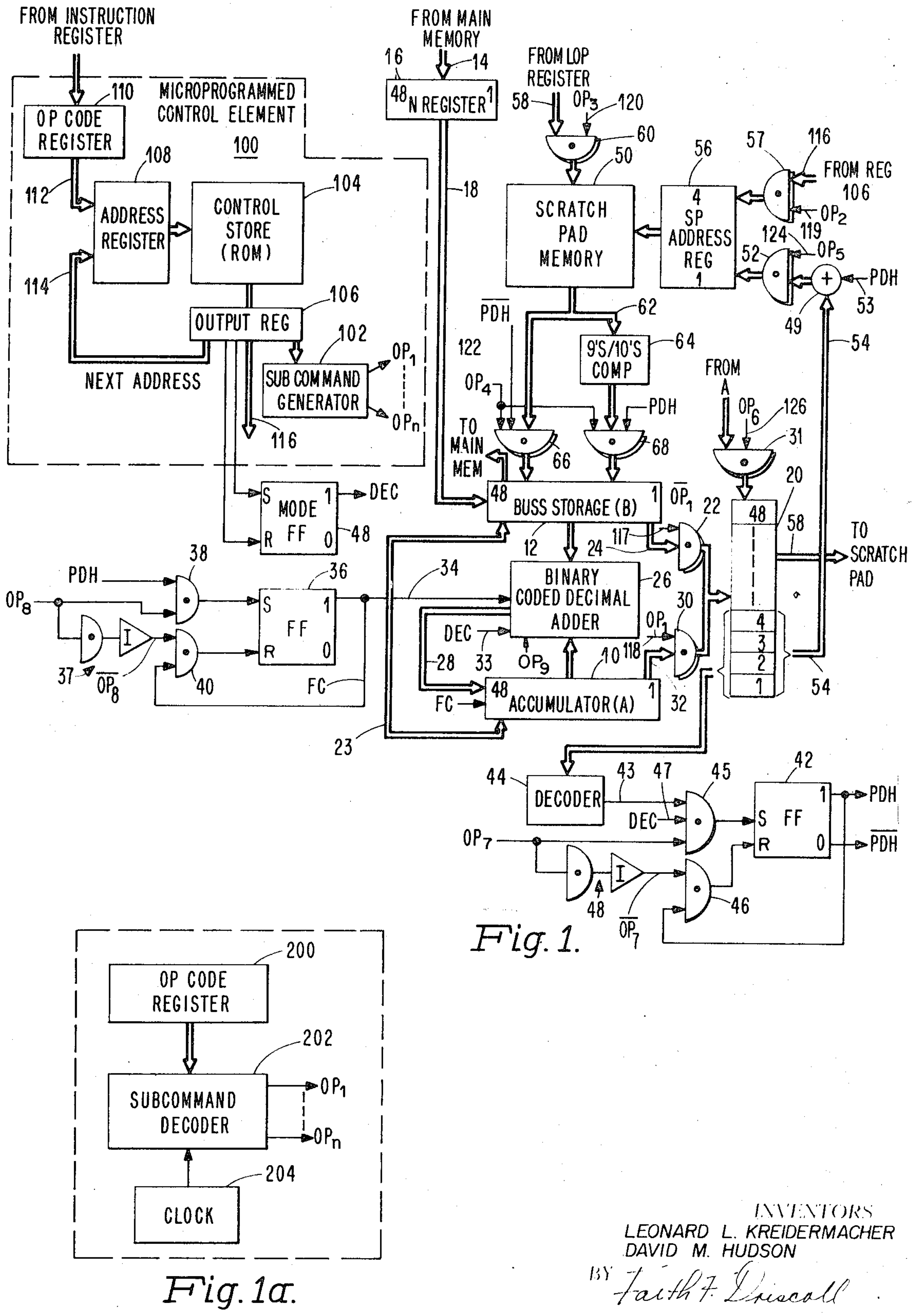
FIG. 1 is a block diagram of an illustrative embodiment of the present invention.
FIG. 1*a* illustrates an alternate form of the control element of FIG. 1.

Referring now to FIG. 1, there is shown as one form of the present invention a system for multiplying a pair of decimal numbers. In the example of the invention chosen for illustration, a 12-digit decimal multiplicand is multiplied by a 12-digit multiplier. Each decimal digit consists of a binary coded decimal character of four bits and hence the multiplicand and the multiplier each constitute a 48-bit word.

For the purpose of simplifying the drawing of FIG. 1, single light lines represent single-wire conductors and single heavy lines are used to represent multiple-wire conductors or busses. Similarly, gates drawn with light lines represent a single gate and gates drawn with heavy lines represent a plurality of gates.

The multiplication of two decimal words is controlled by various control signal levels, referred to as $OP_1$ through $OP_n$ in FIG. 1, some of which occur concurrently and some of which occur in a certain order. In the preferred embodiment, these control signal levels are generated by a microprogrammed control element 100 of FIG. 1 which may also be a part of the control portion of a computer system. These control signal levels are generated by a subcommand generator 102 which decodes the bit patterns of the microinstructions read out into an output register 106 from addressed word locations of a read-only control memory store 104. The control signal levels are, in turn, distributed to the various gates and registers within the system.

In the illustrated embodiment, the control store 104 is electrically alterable. A clock, not shown, cycles each addressed word location twice by applying pairs of pulses at a 125-nanosecond rate. This technique permits an increased amount of control signal levels i.e., subcommands) to be generated from each microinstruction word. The control store 104 is addressed by a memory address register 108 which receives a starting address from an OP code register 110 via a path 112. Additionally, the address register 108 receives, as a next address, a branch address from each microinstruction word read out into the output register 106 via a path 114.

Alternatively, the aforementioned control signal levels may be generated under the control of wired-in "hardware" in contrast to the "firmware" arrangement of FIG. 1. The FIG. 1*a* illustrates a "hardware" control element which includes an OP code register 200, a subcommand decoder 202, and a clock 204.

In the multiplication system of FIG. 1, there are a pair of registers 10 and 12, the former of which normally holds the arithmetic results. These registers are referenced in FIG. 1 as the accumulator register or A register and the buss storage register or B register. A main buss 14 supplies via auxiliary register 16, referred to as N register in FIG. 1, 48-bit words to the 48-stage A and B registers respectively along a path 18 and a path 23. Initially, the word stored in the A register 10 is the multiplicand. However, as mentioned above, the A register 10 during the multiplication operation stores the accumulated result (i.e., partial product) produced by a decimal adder 26, the result being transferred thereto via a path 28. Additionally, the A register 10 may also transfer and receive respectively via the path 23, information words to and from the B register 12. The transfers from the A register 10 to main memory via the B register proceed along a separate path as shown.

The system of FIG. 1 also includes a low-order product register 20 which serves as a multiplier and partial product register. Initially, the low-order product register 20 stores the 48-bit word multiplier transferred from the B register 12 along a path 24 via an AND-gate 22 when the gate has its output 117 conditioned by the control level, $\overline{OP}_1$, from the generator 102. During the multiplication operation, the multiplier register 20, as previously mentioned, serves as a partial product register and receives the digit contents of the least significant decimal character position of the A register 10. The contents of the least significant position of the accumulator are transferred via an AND-gate 31 along a path when the gate has its input lead 126 conditioned by the control signal level, $OP_6$, from the generator 102. Simultaneous with the transfer, the same control signal level $OP_6$ from generator 102 additionally causes each decimal character to be shifted into the most significant decimal character position of the register 20.

Each of the registers 10, 12 and 20 may take the form of a series of interconnected bistable flip-flops. Although the stages of each register may be connected to operate in a serial fashion, to provide optimum speed, the registers are connected to operate in the parallel mode. For examples of registers of this type, the text titled "Arithmetic Operations and Digital Computers" by R. K. Richards, D. Van Nostrand, Copyright 1955, may be consulted.

The system of FIG. 1 further includes the binary coded decimal adder 26 which, in the illustrated embodiment, takes the form of a parallel word adder capable of summing two-word operands in 250 nanoseconds. The adder may take the form of units described in the aforementioned text of R. K. Richards. Alternatively, the decimal adder 26 may be an expanded form of the adder described in the U.S. Pat. No. 3,400,259, assigned to the assignee of the present invention, which by this reference is incorporated herein. As disclosed by the patent, the adder combines each decimal character as binary numbers whose sum is modified by a possible carry. The result, including the carry-in, is decoded by a decoder into a decimal digit and a possible carry-in derived by the decoding is in turn applied to the next higher order decimal character position. When the adder 26 is implemented as mentioned, it it connected to receive via a further input lead 33, a control signal level, referenced as DEC in FIG. 1, from the bistable element 48. The signal level, DEC, conditions the adder 26 for decimal operations.

The adder 26, in addition to receiving the words from the registers 10 and 12 also receives a forced carry-in signal level via a line 34, referenced as FC in FIG. 1, via a low-order carry generator which takes the form of a bistable device 36. In the manner described herein, the bistable device 36 is set and reset in accordance with the control signal level, PDH, by a pair of control signal levels, referred to as $OP_8$ and $\overline{OP}_8$ in FIG. 1, applied to its input via AND-gates 38 and 40. In the absence of the signal PDH, the control signal level $OP_8$ inverted by a gate inverter circuit 37, applied to the gate 40 switches automatically the bistable device 36 to its reset or binary "zero" state.

The control signal levels PDH and $\overline{PDH}$ are generated by a further bistable device 42. The bistable device 42 has its state set in accordance with a decoding of the multiplier digit contents of the least significant decimal character position of the low-order product register 20, by a decoder 44, conventional in design. The decoder output applied to a lead 43, in turn, sets or resets the device 42. More specifically, appropriate control signal levels, referenced as $OP_7$ and $\overline{OP}_7$ in FIG. 1, are applied via a pair of AND-gates 45 and 46 respectively to the inputs of the bistable device 42. An output from decoder 44 and control level, DEC on input 47 condition the AND-gate 45 to switch the bistable device 42 to its binary "one" or set state. In the absence of an output from lead 43, the control signal level $OP_7$ inverted by a gate and inverter circuit 48 and applied to the gate 46 switches bistable device 42 to its reset or binary "zero" state.

Continuing on with the operation of the system of FIG. 1, during the initial multiple generation process, the contents of the low-order product register 20 are applied as data input to the memory 50. Specifically, the contents of the register 20 are applied along a path 58 via an AND-gate 60 and written into an addressed word location of a scratch pad memory 50. Writing occurs concurrently with the conditioning of the AND-60 by a control signal level, $OP_3$ applied to an input 120 from the generator 102.

During the multiplication operation, the least significant decimal character position of the register 20 supplies an address to a four-stage memory address register 56. The contents of address register 56 are decoded by the memory 50 and, in turn, are used to address multiples to be read out from the scratch pad memory 50. More specifically, the contents of the least significant four-bit decimal character position of register 20 are applied through an incrementer or adder circuit 49 via an AND-gate 52 along a path 54 to the address register 56 when AND gate input lead 124 is conditioned by a control signal level, $OP_5$, from generator 102. The adder circuit 49 receives as an incrementing input, the control signal level, PDH from the bistable device 42 via an input lead 53. The control level PDH, when present, increments by one the contents of the least significant four-bits decimal position prior to their transfer into address register 56. Additionally, the address register 56 receives address signals from the output register 106 of the control store 104 along a path 116 via an AND-gate 57 when its input 119 is conditioned by a control signal level $OP_2$ from generator 102.

In the illustrated embodiment of the present invention, the memory 50 may comprise up to 16 words of storage, each word having 48 bits. However, for the purpose of the present invention, there need only be six words of storage, each coded in binary coded decimal representation with each word containing 1 four-bit decimal characters.

Since with the advent of integrated circuits, the cost of the additional word storage is very small, hence, the system of FIG. 1 may normally include additional word storage for use as working space and to perform other operations.

The scratch pad memory 50 and associated read/write circuits may take the form of the low-cost high-speed integrated circuit memory array described in copending Pat. application, Ser. No. 517,218, assigned to the assignee of the present invention, which is incorporated herein by reference.

The 48-word bit output of the scratch pad memory 50 is applied to a buss 62 and then in parallel to AND-gates 66 and 68. These gates, in turn, transfer the memory word output either directly or complemented to the B register 12. More particularly, the word contents applied to the buss 62 are applied in parallel to the AND-gate 66 and to AND-gate 68 via a complementer 64. The AND-gates 66 and 68, in addition, jointly receive control signal level referenced as $OP_4$ on lead 122 and the signals $\overline{PDH}$ and PDH, respectively. When conditioned by the control level $op_4$, the AND-gates 66 and 68 alternatively transfer to the B register 12 the word output appearing on buss 62 either directly (i.e., uncomplemented) or complemented in accordance with the state of device 42.

In the illustrated embodiment, the complementer 64 translates or converts a selected 48-bit binary coded decimal multiple into its 10's complement. It should be noted that the 10's complement of a decimal number may be formed by subtracting the number from 10. Alternatively, the 10's complement may be formed by subtracting the number from 9 and adding 1 to the least significant digit of the difference. Instead of performing the aforementioned subtraction by an adder subtractor unit, the apparatus of the present invention implements subtraction by complement addition conversion techniques.

The complementer 64 in the illustrated embodiment includes translating logic which converts the binary coded decimal multiple into a 9's complement code. The flip-flop 36 completes the generation of the 10's complement by forcing a low-order carry signal via line 34, referenced as FC in FIG. 1, into the least significant bit position of the adder 26. Since the above-mentioned translating logic is well known in the art, it will not be described in further detail herein. However, for the purpose of illustration, the Boolean expressions illustrating the symbols logic for translating a single four-bit decimal character digit into 9's complement code are listed below.

| Nine's complement output For Bit Positions | | Binary coded decimal Bit Positions |
|---|---|---|
| 1 | = | 1' |
| 2 | = | 2 |
| 3 | = | (3'.2+3.2') |
| 4 | = | (4'.3'.2') |

where ' = the negation or "0" output of the digit.

Since both the assertions and negations for each multiple digit are available from the memory 50, translation is performed without introducing additional inverting amplifier stages.

Figure 2A:
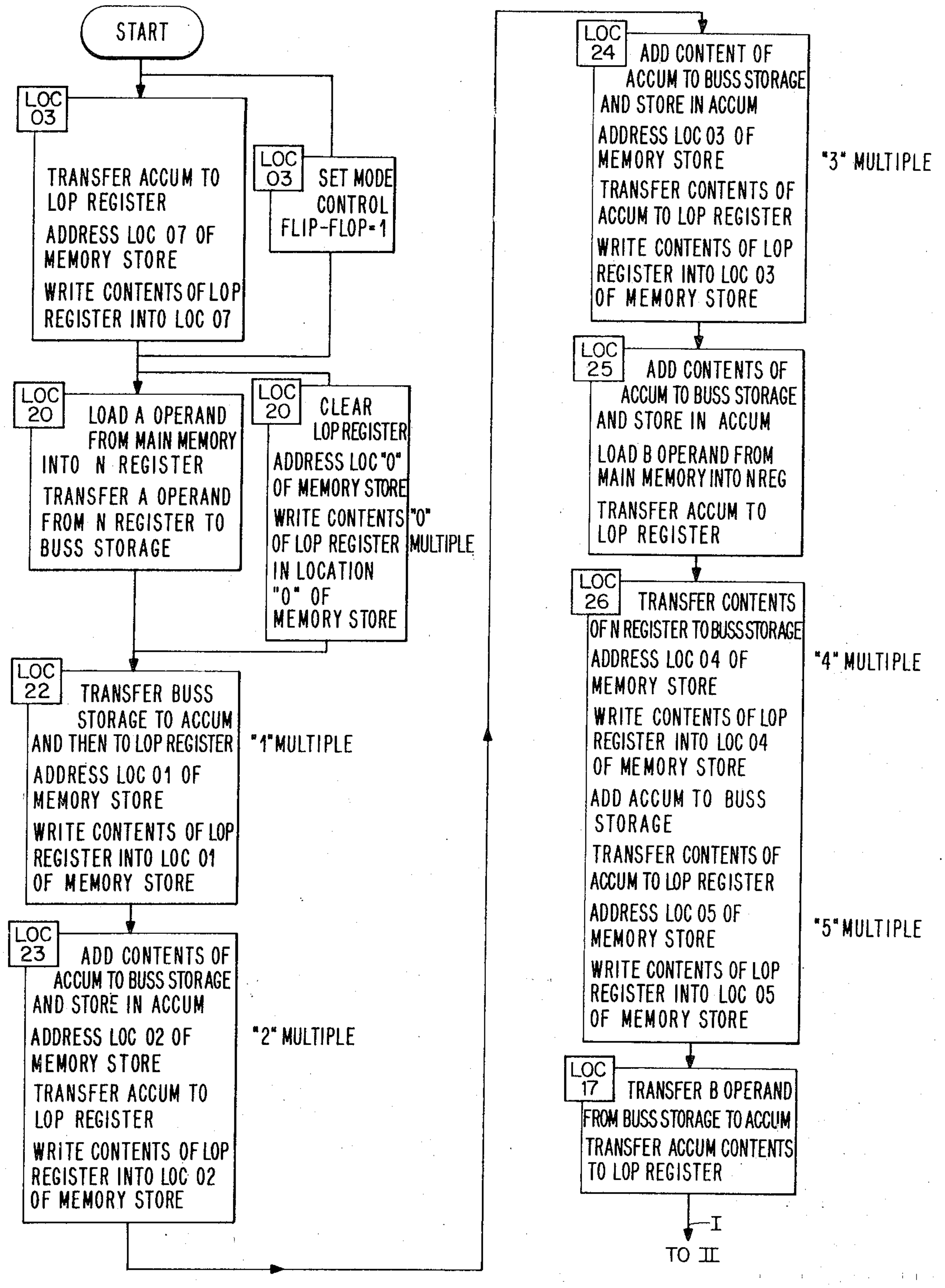
FIGS. 2*a*, *b*, and *c* are a flow diagram used in explaining the operation of the subject invention.
Figure 2B:
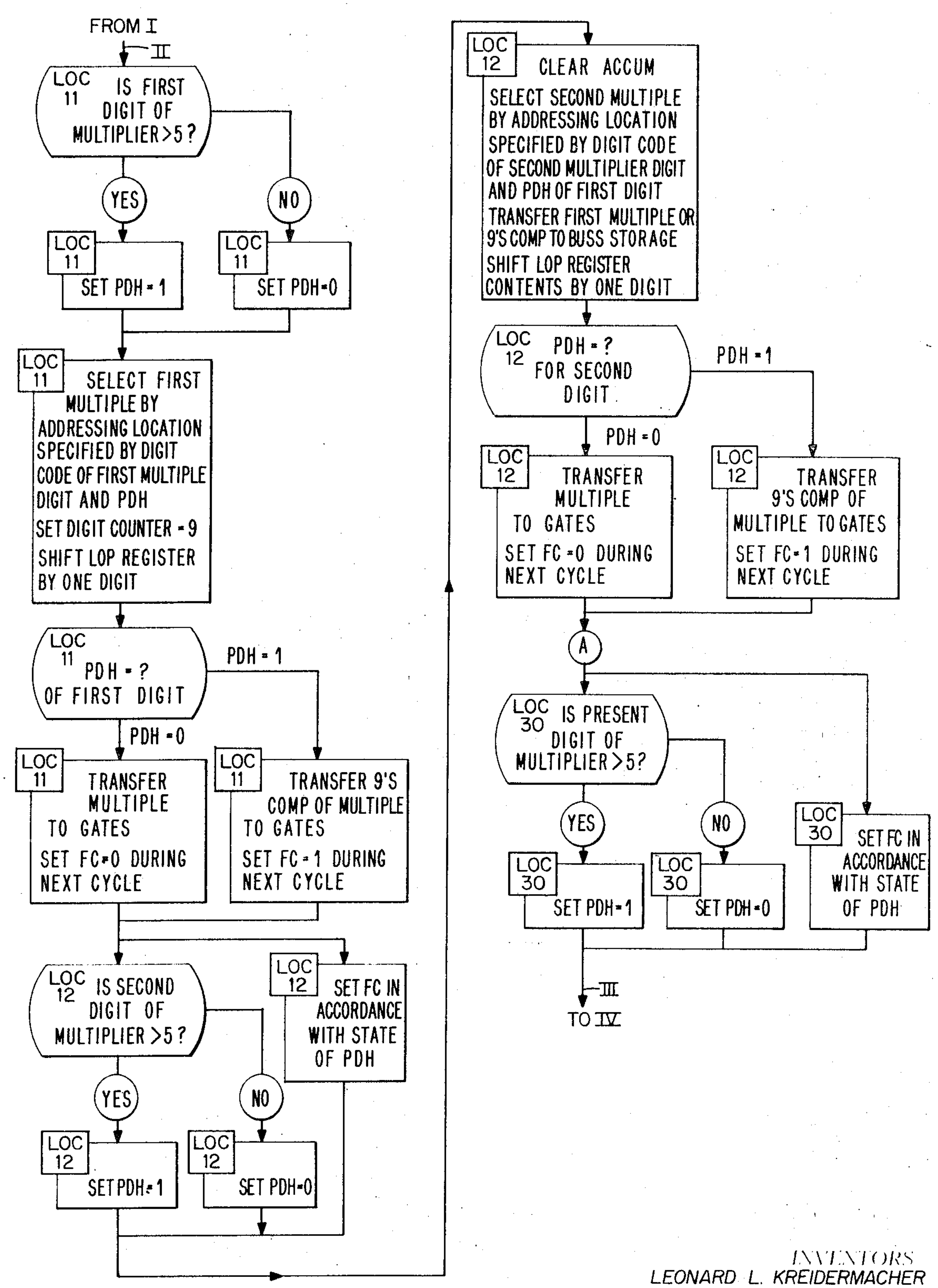
Figure 2C:
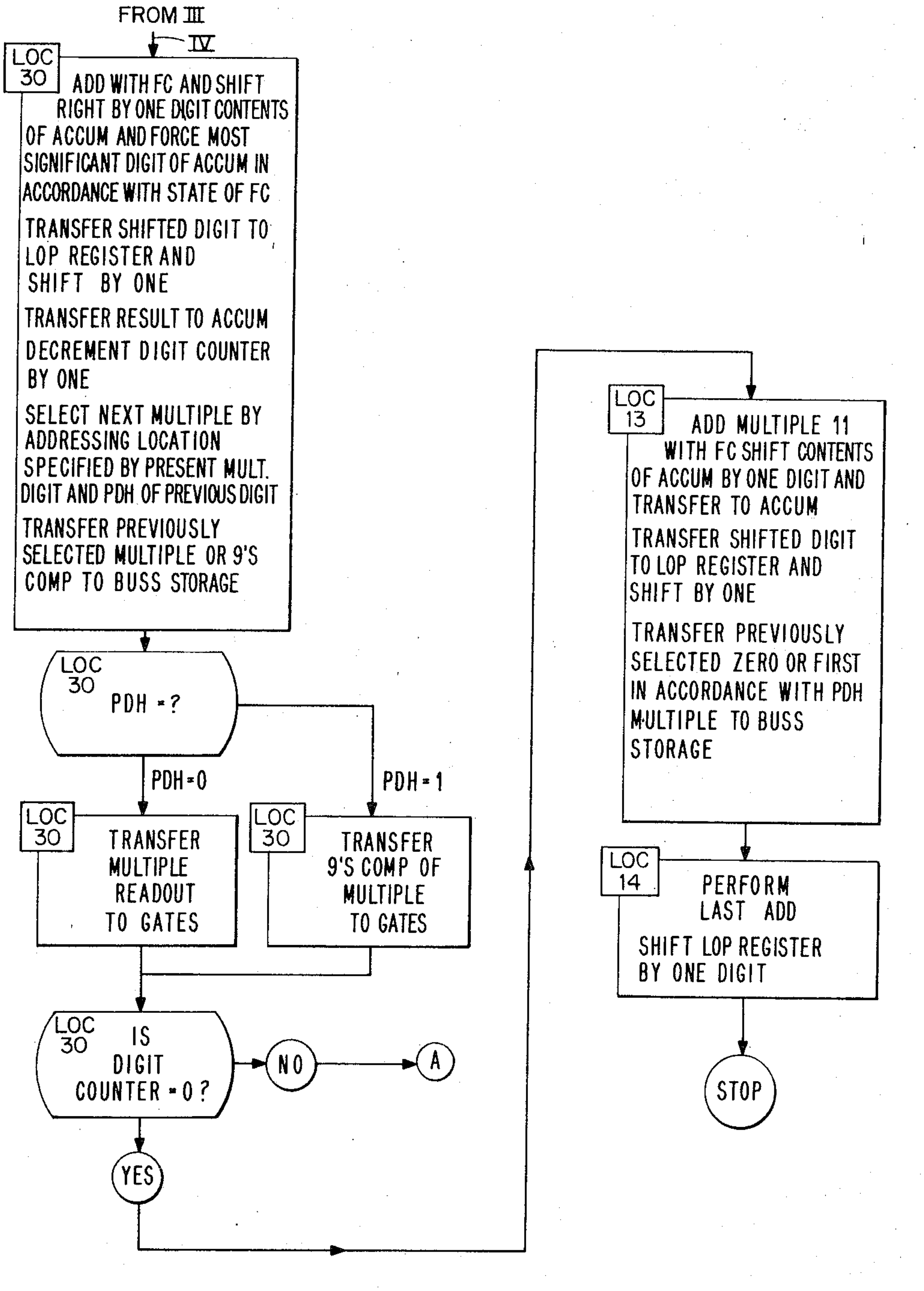

In FIG. 2, the upper left-hand corner of each block, for purposes of illustration, designates the address of microinstruction word location in the control store 104 whose decoding generates the requisite control signal levels for executing the operations indicated in that particular block. For the purposes of simplification, concurrent operations, in some instances, are illustrated as if they occur in time sequence.

Since the flow chart of FIG. 2 indicates with considerable details the operational flow of the decimal multiply instruction, the operations are described herein only as necessary to understand the operation of the system of FIG. 1. In the illustrated embodiment of the present invention, first, the initial generation and storage of the multiples 0, 1, 2, 3, 4 and 5 of the multiplicand begins concurrently with the arrival of the A operand or multiplicand from main memory. The generation and storage of the multiples occurs during the transfer of the B operand or multiplier from main memory into the low-order product register 20. Since a finite time is required to gain access to main memory for obtaining the B operand, the initial generation and storage of the multiples does not increase the overall time of the multiplication operation.

With reference to FIG. 1, the OP code of the decimal multiply instruction is transferred into the OP code register 110 and then to memory address register 108. The OP code contents serve as a starting address for either direct or indirect referencing of the algorithm used to generate multiples of the multiplicand to be stored. In accordance with the present invention, multiples zero through 5 of the multiplicand are initially generated and stored in the memory 50.

As illustrated by FIG. 2, the above generation and storage of the multiples 0, 1, 2, 3, 4 and 5 are microinstruction words stored in word locations 03, 20, 22, 23, 24, 25, 26 and 17 of the control store 104. The addressing of the locations in the sequence indicated is accomplished by the special coding of the branch address field of the previously read out microinstruction, the branch address in each instance supplying the appropriate next address.

With reference to FIG. 2, the readout from decoding of the microinstruction word location 03 produces control signal levels which cause the switching of the mode flip-flop 48 to its "one" or set state and the writing of the contents of the accumulator register 10 into a working location, referenced as word location 07 in FIG. 2, of memory 50.

The "zero" multiple is generated in parallel with the loading of the A operand, by clearing the register 20 to zeros, addressing location zero via AND-gate 57, and writing the zero contents of register 20 into that addressed location via AND-gate 60. The decoding of the bit pattern of the microinstruction readout from word location 20 of the control store 104 produces control signal levels $OP_2$ and $OP_3$ on line 119 and 120, in addition to signal levels not shown, which accomplish the above-mentioned operations of clearing, addressing, and writing.

The remaining multiples 1, 2, 3, 4, and 5, as illustrated by the flow chart of FIG. 2, are generated by repeatedly adding the multiplicand contents of the B register 12 to the contents of the accumulator or A register 10 representing the results of a previous addition, and then storing the result in successively addressed word locations of scratch pad memory 50. The control signal levels, $OP_1$, $OP_2$ and $OP_3$ together with control signal levels applied via line 116 perform the requisite transfer, addressing, and writing operations. Since the adder 26 adds continuously, it automatically accumulates results of each addition without the aid of control signal levels from the control element 100. The adder 26 when conditioned by a control level $OP_9$, transfers its contents to A register 10. It will be noted that additional control levels (not shown) effect other system register transfers (e.g., N register to B register and B register to A register).

When the control store 104 has completed its readout and decoding of the microinstruction word stored in location 17, as illustrated by FIG. 2, the system of FIG. 1 is ready to begin the execution phase of the decimal multiply instruction. At this time, the multiples zero through 5 will have been generated and stored into word locations zero through 5 and the B operand (multiplier) will have been stored in the register 20.

Before considering an example, reference is made to the following table which lists the way in which each of the multiples are generated.

TABLE.—MULTIPLE SELECTION FOR DECIMAL MULTIPLICATION

| Decimal digit | Code | Previous decimal carry | Selected multiple | XFER/ COMP | New decimal carry |
|---|---|---|---|---|---|
| 0 | 0000 | 0 | 0M | XFER | 0 |
| 1 | 0001 | 0 | 1M | XFER | 0 |
| 2 | 0010 | 0 | 2M | XFER | 0 |
| 3 | 0011 | 0 | 3M | XFER | 0 |
| 4 | 0100 | 0 | 4M | XFER | 0 |
| 5 | 0101 | 0 | 5M | XFER | 0 |
| 6 | 0110 | 0 | 4M | COMP | 1 |
| 7 | 0111 | 0 | 3M | COMP | 1 |
| 8 | 1000 | 0 | 2M | COMP | 1 |
| 9 | 1001 | 0 | 1M | COMP | 1 |
| 0 | 0000 | 1 | 1M | XFER | 0 |
| 1 | 0001 | 1 | 2M | XFER | 0 |
| 2 | 0010 | 1 | 3M | XFER | 0 |
| 3 | 0011 | 1 | 4M | XFER | 0 |
| 4 | 0100 | 1 | 5M | XFER | 0 |
| 5 | 0101 | 1 | 4M | COMP | 1 |
| 6 | 0110 | 1 | 3M | COMP | 1 |
| 7 | 0111 | 1 | 2M | COMP | 1 |
| 8 | 1000 | 1 | 1M | COMP | 1 |
| 9 | 1001 | 1 | 0M | COMP | 1 |

When the sum of the multiplier digit and previous decimal carry has a value between 0 and 5, the successive multiples for the multiplier digits with values from 0 to 5, respectively, are generated by selection and direct transfer of the multiples 0 through 5. It will be noted from the table that no new decimal carry is generated for the next multiplier digit whose sum of the multiplier and carry from the previous multiplier digit is either equal to or less than 5.

However, when the sum of the multiplier digit and previous decimal carry has a value between 6 and 10, the successive multiples for the multiplier digits with values from 6 to 10, respectively are generated by selecting and complementing the multiples 4 up to 0. Also, it will be noted that when the sum of the multiplier digit and carry from the previous multiplier digit exceeds 5, a decimal carry is generated for the next multiplier digit.

During the execution phase of the multiplication operation, the microinstruction words stored in locations 11, 12, 30, 13 and 14 of control store 104 are read out in succession and decoded. The readout and decoding of the microinstructions in locations 11, 12 generates the control signal levels necessary to process the first and second multiplier digits. Normally, prior to addressing of location 11, the first digit, a sign digit, stored in the least significant character position of the register is cleared and the contents of register 20 are shifted by one digit.

During the processing of the first digit, a counter, not shown, is set to a count specifying the number of additions to be performed by the system prior to entering two completion cycles. Two further additions are performed during the completion cycles and therefore, the digit counter is set initially to a count of 9. As illustrated by FIG. 2, each cycling through location 30 decrements the counter by one and after 10 cycles, the counter will have been detected to have a zero count. Each readout and decoding of the microinstruction in location 30 produces control signal levels for processing a multiplier digit. The readout and decoding of the microinstructions in locations 13 and 14 produce the control signal levels required for processing multiplier digits 11 and 12 which completes the multiplication operation.

The basic operation of the system of FIG. 1 and the flow diagram will best be understood by considering the following example. It is assumed that in a decimal multiplication operation, a multiplicand of decimal value 111111 is to be multiplied by a multiplier of decimal value 765359. The steps of the multiplication are as listed below together with the results as they would appear in the A register 10 and the low-order product register 20 upon the completion of the multiplication.

The contents of the scratch pad memory 50 for the following example are as shown below.

SCRATCH PAD MEMORY 50

| | | | |
|---|---|---|---|
| Loc 0 | 000000 (0M) | Loc 3 | 333333 (3M) |
| Loc 1 | 111111 (1M) | Loc 4 | 444444 (4M) |
| Loc 2 | 222222 (2M) | Loc 5 | 555555 (5M) |

EXAMPLE

| | | |
|---|---|---|
| Select 9's multiple | 111111<br>765359 | |
| | 111111 | |
| | 888888<br>1 | 10's complement. |
| | ↓ 9888889 | |
| Select 6's multiple | 555555<br>1 | Do. |
| | ↓ 9544444 | |
| Select 4's multiple | 444444 | |
| | ↓ 0398888 | |
| Select 5's multiple | 555555 | |
| | ↓ 0595443 | |
| Select 6's multiple | 555555<br>1 | Do. |
| | ↓ 9615100 | |
| Select 8's multiple | 777777<br>1 | Do. |
| | ↓ 9739288 | |
| Select 1's multiple | 111111 | |
| | 085039 | |

| 0 | 8 | 5 | 0 | 3 | 9 |
|---|---|---|---|---|---|

Accumulator register 10

| 8 | 0 | 3 | 8 | 4 | 9 |
|---|---|---|---|---|---|

Register 20

The first multiplier digit to be processed is a 9. In accordance with the previous table, the generation of the 9's multiple is accomplished by the readout and taking the 10's complement of the 1's multiple. Since this is the first digit, the previous digit device 42 of FIG. 1 is reset, that is, there is no decimal carry from a previous multiplier digit.

More specifically, the 9 multiplier digit causes the addressing of the word location 1 which stores the 1's multiple of the multiplicand. Concurrently therewith, the decoding of the multiplier digit 9 established by the control level, $OP_7$, causes the device 42 to be set to its binary "one" state thereby producing as an output the control signal level, PDH. Since the sum of the previous decimal digit and present multiplier digit has a value between 6 and 10, the signal level PDH conditions the AND-gate 68 to transfer the 9's complement of the selected 1's multiple to the adder 26 for addition to the number already in the register 10. In the case of the first multiplier digit this sum is zero.

The control level, PDH, also causes the switching of the forced significant device 36 to its binary "one" state thereby producing the control signal level, FC. Accordingly, a "one" is introduced into the low-order bit position of the adder 26 which completes the generation of the 10's complement and the accumulated sum 888889 appears in the A register. The contents of the A register 10 is shifted by one digit and the least significant digit (9) is transferred into the most significant character position of the multiplier register 20. Simultaneously, therewith, the control signal level, FC, forces the most significant character position of the A register 10 to a 9 and the register now stores 988888.

Because the previous multiplier digit was greater than 5 and therefore sets the device 42, the next higher multiple is selected. That is, the multiplier digit 5 together with the presence of control signal level, PDH, selects the 6's multiple by addressing the word location 4 which stores the 4's multiple of the multiplicand. Additionally, the presence of the signal PDH again sets the device 42 to its binary "one" state thereby producing the control signal level, PDH. Accordingly, the AND-gate 68 transfers the 9's complement of the 4's multiple into the adder 26. Again, the device 36 is in its "one" state and causes a "one" to be introduced into the low-order bit position of the adder 26 via the lead 34 which completes the generation of the 10's complement of the 4's multiple. The 10's complement of the 4's multiple is added to the portion of the partial product stored in the register 10 which was accumulated during the preceding cycle. The adder's accumulated sum of 544444 is transferred to the A register.

Concurrently therewith, the contents of the A register are shifted by one digit and the least significant character digit (4) is transferred into the most significant digit position of the multiplier register 20. Additionally, because of forced carry-in signal, FC, the most significant digit position of the A register 10 stores a 9 making the sum 954444.

Since there is a decimal carry from the previous multiplier digit (i.e., the control level, PDH in its set state) the multiplier digit 3 selects the next higher multiple by addressing the word location 4 storing the 4's multiple. Further, since the sum of the previous digit and multiplier digit is between 0 and 5, flip-flop 42 resets and the gate 66 is conditioned by control signal $\overline{PDH}$ to directly transfer the 4's multiple into the adder 26 where it is added to the previously accumulated sum. Again, with device 42 reset no forced carry-in is generated, a zero is forced into the most significant digit position of the A register and the A register 10 now stores the sum 398888. The A register 10 retains the sum except for the least significant character (8) which is transferred directly into the most significant character position of the multiplier register 20.

The fourth multiplier digit to be processed is a 5. Since there is no decimal carry from the previous multiplier digit, the multiplier digit 5, in accordance with the above table, selects the 5's multiple for readout into the adder 26. That is, the multiplier digit 5 causes the addressing of word location 5 which stores the 5's multiple. Again, devices 42 and 36 remain reset. Accordingly, the 5's multiple is directly transferred into the adder 26 and added to the retained portion of previously generated partial product. The accumulation is then transferred to the A register whereafter the registers now stores the sum 595443. The contents of the A register 10 are shifted by one character position with a "zero" being inserted into the most significant digit position and the least significant character (3) is transferred into the most significant character position of the multiplier register 20. As shown, the A register 10 now stores the sum 059544.

The next multiplier digit to be processed is a 6 and there is no decimal carry from the previous multiplier digit. In accordance with the above-mentioned table, the generation of the 6's multiple is accomplished by the addressing and readout of the 4's multiple followed by the selection of the complement of the multiple.

More specifically, the multiplier character digit 6 causes the addressing of the word location 4 which stores the 4's multiple. Concurrently therewith, the decoding of the multiplier digit 6 causes the device 42 to be switched to its "one" state thereby producing the control signal level, PDH, which in turn causes the AND-gate 68 to transfer the 9's complement of the 4's multiple into the adder 26. The signal FC completes the generation of 10's complement by introducing via line 34 the forced carry-in signal FC into the low-order bit position of the adder 26. The adder 26 now stores the resultant sum 615100. The contents of the A register 10 is shifted by one digit and the least significant digit (0) is transferred into the most significant character position of the low-order product register 20. Concurrently therewith, the control signal level, FC, forces the most significant character position of the A register 10 to a 9 and the A register now stores the accumulated sum 961510.

In accordance with the above example, the last multiplier digit to be processed is a 7. Since there is a decimal carry from the previous multiplier digit, the control signal level, PDH, generated by device 42 causes the word location storing the next higher multiple (i.e., the 8's multiple) to be addressed. Concurrently therewith, the decoding of the multiplier digit 7 by the decoder 44 switches the device 42 again to its set r binary "one" state thereby producing the control signal level, PDH. Accordingly, the presence of the control level, PDH, causes the complement of the 2's multiple to be selected.

Specifically, the control signal level, PDH, in the manner previously described, causes the gate 68 to transfer the 9's complement output of the 2's multiple into the adder 26 and the device 36 to force a binary "one" carry-in signal into the adder's low-order bit position. Simultaneously therewith, the device 36 through the control signal, FC, forces a 9 into the most significant character position of the A register 10. At the completion of the addition, the A register now stores the sum 749288. Again, the contents of the A register 10 are shifted right by one character position and the least significant character (8) is transferred into the most significant character position of the multiplier register 20. At the conclusion of this last operation, the A register 10 now stores the sum 974928.

During the last addition, the presence of the control signal level, PDH, causes the addressing of word location 1 which stores 1's multiple. Since the last multiplier digit is a zero, the device 42 is switched to its reset of binary "zero" state. Accordingly, the presence of control signal level, $\overline{\text{PDH}}$, causes the gate 66 to transfer directly 1's multiple into the adder 26. Upon the completion of the last addition, the adder 26 stores the accumulated sum 085039. This sum is transferred to the A register 10. Both registers at the completion of the multiplication now store those sums indicated.

The present invention provides, as described, an improved apparatus for performing arithmetic operations by generating all multiples required by the operation through a single operation (i.e., direct transfer or complement) performed upon selected prestored multiples. In the illustrated embodiment of the invention, this is accomplished by generating and storing a plurality of multiplies of an operand, the number of nonzero multiples being equal to half the total number of digit symbols used in the system. Stated differently, the number of nonzero multiples equals half the radix.

While the present invention has disclosed the use of either a 10's complementer or 9's complementer logic for performing the required complement function, other equivalent techniques such as subtraction may be also used.

It will also be noted that the system illustrated stored the 'zero" multiple and generated zero's multiple and 10's multiple respectively by transferring the prestored zero's multiple directly and complemented for addition to the previously generated partial product. This last technique was employed because the system is able to perform the addition within a very short period of time. More specifically, this period of time is shorter than the time which would be required to detect the presence of a "zero" multiplier digit and initiate an appropriate branch to another microinstruction sequence for accomplishing a "shifting over 0's" operation. However, this last operation in addition to other techniques normally employed to decrease the overall multiplication time may also be used in combination with the subject invention without departing from the teachings thereof.

Although the present invention has been described in terms of a multiplication operation, it should be noted that the multiple generation and storage technique of the present invention and apparatus for implementing same finds broader application. For example, the apparatus of FIG. 1 may also be used for performing decimal division. More specifically, the same facility apparatus used to initially generate and store the multiples 1, 2, 3, 4 and 5 for selection during multiplication may be also used for initially generating and storing the multiples 0, 1, 2, 3, 4 and 5 of the divisor. Thereafter, the same apparatus may be used to generate all multiples required for division by performing a selectable operation of either directly transferring or complementing selected prestored multiples as a function of the value of the most significant digit position of the dividend.

The operation of the subject invention has been illustrated through a flow chart which contains a plurality of function blocks, each of which lists the address of the word location storing the microinstruction for executing the designed operations. The exact coding for individual microinstructions was not disclosed since the engineer is free to select alternate forms of coding.

For further details and insight into examples of techniques which may be employed, reference may be made to the following references which are herein incorporated by reference.

PRIOR ART MICROPROGRAMMING REFERENCES

1. "Microprogramming and the Design of the Control Circuits in an Electronic Digital Computer" by M. V. Wilkes and J. B. Stringer, Proc. Cambridge Phil. Soc., pp. 230 through 238, Apr. 1953.

2. R. J. Mercer, "Microprogramming" in Apr. 1957 issue of Jour. Assoc. Computing Machinery, pp. 157 through 171.

3. U.S. Pat. Nos. 3,215,987; 3,245,044; 3,246,303; 3,258,748; 3,300,764; 3,302,183; 3,349,379; 3,380,025; 3,387,279; 3,389,376; 3,391,394; 3,400,371; 3,434,112; 3,444,527; 3,469,247.

4. Honeywell Computer Journal, Winter-Spring 1968, "-Model 4200–8200 Read-Only Memory Control Logic," by Stuart Klein and Scott Schwartz.

COPENDING APPLICATIONS RELATED TO MICROPROGRAMMING

1. Copending patent application assigned to same assignee as this application: "Microprogram Control Apparatus" by Scott Schwartz, Ser. No. 694,928 filed Jan. 2, 1968 now U.S. Pat No. 3,560,933.

2. Copending patent application assigned to same assignee as this application: "Method and Apparatus for Peripheral Device Assignment, and Validity Check and Relocation, if Assignment is Valid" by James B. Geyer and Victor M. Benson, Ser. No. 875,901 filed Nov. 12, 1969.

3. Copending patent application assigned to same assignee as this application: "Instruction Translation Control with Extended Address Prefix Decoding" by John Mekota, David Hudson, Thomas Rankin, Jean Champagne, Ser. No. 875,902 filed Nov. 12, 1969.

4. Copending patent application assigned to same assignee as this application: "Multiple Branch Technique" by George S. Hoff and Ming-Tzer Miu, Ser. No. 694,949 filed Jan. 2, 1968 now U.S. Pat. No. 3,570,006.

5. Copending patent application assigned to same assignee as this application: "Interlocking Data Subprocessors" by Victor M. Benson and Stuart K. Klein, Ser. No. 718,493 filed Apr. 3, 1968.

6. Copending patent application assigned to same assignee as this application: "Sharing of Microprograms Between Processors" by George Hoff and Richard Kelly, Ser. No. 875,900 filed Nov. 12, 1969.

7. Copending patent application assigned to same assignee as this application: "Apparatus for Independently Assigning Time Slot Intervals and Read-write Channels in a Multiprocessor System" by Robert Fisher, Ser. No. 771,147 filed Oct. 28, 1968 now U.S. Pat. No. 3,560,937.

8. Copending patent application assigned to same assignee as this application: "Microprogram Branch Control" by Leonard Kriedermacher, Ser. No. 875,910 filed Nov. 12, 1969.

To prevent undue burdening the description with matter within the ken of those skilled in the art, a block diagram approach has been followed, with a detailed functional description of each block and specific identification of the circuitry it represents. The individual engineer is free to select elements and components such as flip-flop circuits, shift registers, etc., from his own background or from available standard references, such as "Arithmetic Operations in Digital Computers" by R. K. Richards, (Van Nostrand Publishing Company), Computer Design Fundamentals by Chu (McGraw-Hill Book Company, Inc.), and Pulse, Digital and Switching Waveforms by Millman and Taub (McGraw-Hill Book Company, Inc.).

While in accordance with the provisions and statute, there has been illustrated and described the best form of the invention known, certain changes may be made to the system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A decimal multiplying system for multiplying a multiplicand by successive digits of a multiplier each number represented by a plurality of decimal digits, said system comprising:

memory means for storing a number of separate decimal digits representing said multiples of the multiplicand, said number of nonzero multiples generated and stored being equal to half of the total number of decimal digit symbols employed by said system;

an adder including first and second terminals;

an accumulator register for holding an accumulated partial product, said register being coupled to said first terminal of said adder;

logic means coupled to said memory means and to said second terminal of said adder;

multiplier decoder means coupled to said memory means for conditioning said memory means for selecting an appropriate one of said stored multiples in accordance with the sum of digit value of said multiplier digit and previous multiplier digit and said decoder means being coupled to said logic means for conditioning said means for selectively performing a single operation on each selected multiple in accordance with said sum for generation of all of the possible multiples required which are thereafter applied to said first terminal of said adder for addition to the contents of said accumulator register.

2. A decimal multiplying system according to claim 1 wherein said total number equals 10 and the decimal digits representing the multiplicand multiples 1, 2, 3, 4, and 5 are the only of said multiples initially generated and stored in said memory means for selection.

3. A decimal multiplying system according to claim 1 wherein said multiplier decoder means upon sensing a predetermined digit value for said previous multiplier digit representing a carry is operative to condition said memory means for selecting the next successive multiple of said multiplicand for application to said first input of said adder.

4. The system according to claim 3 wherein said predetermined digit value is greater than 5.

5. The system according to claim 1 wherein said logic means includes logic gating means and complementor means, each being connected to said memory means to receive in parallel said separate decimal digits representing said multiples from said memory means, each of said last-mentioned means conditioned by said decoding means upon the sensing of a predetermined digit value for the sum of said multiplier digit and said previous multiplier digit representative of a carry, to selectively apply the multiple selected by said multiplier digit either directly or complemented to said first terminal of said adder to generate all of the possible multiples to be added to said contents of said accumulator register.

6. The system according to claim 5 wherein said complementer means performs a 10's complement operation on said selected multiple when said predetermined digit value of said sum lies between 6 and 10 whereafter said decoder means is operative to generate a carry for the next multiplier digit.

7. The system according to claim 5 wherein said complementor means performs a 9's complement operation on said selected multiple and said decoder means introduces a forced carry-in signal into said adder when said predetermined digit value is greater than 5, completing the 10's complement operation.

8. A multiplier for a data processing system, the combination comprising:

addressable memory means including address register means and a number of multiplicand multiple registers for storing different selected multiples of the multiplicand in binary coded decimal code, said number of nonzero multiples stored being equal to half the total number of digit symbols employed in said system and said multiples capable of being grouped into a direct multiple set and a complement multiple set derivable from said direct set in which the multiples (M—1) of both sets are mutually exclusive;

an adder;

multiplier register means for storing successive decimal digits of a multiplier, said register means being coupled to said address register means for addressing individual ones of registers;

first logic gating means coupled to said memory means and to said adder and when enabled for directly transferring said signal representations of said multiples of said direct set from said addressed memory registers;

second logic gating means coupled to said memory means and to said adder in parallel with said first logic means, said second logic means when enabled for transferring the complement of said signal representations of said multiples of said complement set from said addressed memory registers; and decoding means coupled to said multiplier register means and to said address register means, said decoding means responsive to the value of the sum of each of the successive multiplier digits and a possible carry from a previous multiplier digit to condition said addressing means to select a predetermined one of said multiples, and said decoding means being connected to selectively enable said first and second logic means in accordance with said sum to selectively transfer said signal representation of said selected multiple directly and complemented through said first and second gating means respectively for generation of all possible multiples of said multiplicand.

9. The multiplier of claim 8 wherein said decoding means in response to a predetermined sum conditions said address register means to address the multiple register storing the next highest multiple register for transfer to said adder.

10. The multiplier of claim 8 wherein said decoding means is responsive to digit values between 0 and 5 and 6 and 10 respectively to transfer the signal representation of said multiple through said first and second logic gating means.

11. A system for performing arithmetic calculations with first and second operands representative of binary coded multidigit numbers with each digit having at least four bits, said calculations being performed in a mode of operation wherein a predetermined number of multiples of said first operand are initially generated and stored with each of all of the possible multiples required for the performance of a particular arithmetic operation involving said operands being subsequently generated from the previously stored multiples, said system comprising:

addressable memory storage means having an input and an output, said storage means including a plurality of multiple registers, each for storing a different one of said multiples of said first operand;

an arithmetic device for adding two number signals applied to first and second terminals thereof;

logic means coupled to said memory means and to said device, said logic means conditioned for performing a single operation of selectively transferring the multiple at said output directly or in complement from to said device;

an accumulator register connected to said second terminal for storing the intermediate results of an arithmetic operation;

multiplier register means for storing each of the successive digits of said second operand, said register means being coupled to said input of said storage means;

microprogrammed control sequencing means connected to be responsive to an op code of an instruction for specifying the type of arithmetic operation to be performed, to produce first sets of control signals for conditioning said system to generate from said first operand said predetermined number of said different selected multiples and store said multiples in said storage means, said predetermined number of nonzero multiples stored being equal to half the total range of multiples capable of being signaled by the sum of largest multiplier digit and a carry from the previous multiplier digit and, said microprogrammed control means operative during the processing of each multiplier digit during said performance of said arithmetic operation to produce second sets of control signals to produce all possible multiples for said arithmetic device involving said digit by conditioning said logic means to perform said single operation upon the contents of each of the addressed operand multiples in accordance with the value of each of said multiplier digits and said carry whereby said arithmetic device adds each of said addressed operand multiples applied by said logic means to said first terminal to the contents of said accumulator register whereafter a chosen number of cycles of said second sets of control signals, the final results of said arithmetic operation are obtained.

12. A multiplier which operates by additions of multiplicand multiples from a partial product, each multiple represented by digits in a decimal code, comprising:

an addressable memory including a plurality of multiple storage locations for storing zero, first, second, third, fourth and fifth multiples generated from the multiplicand and being equal to the multiplicand multiplied by 0, 1, 2, 3, 4 and 5, said memory further including an address register for addressing each of said storage locations for readout of the contents thereof;

first and second shiftable accumulator registers, each having a high-order end and a low-order end for initially holding the multiplier and for receiving the digits of the final product and accumulated partial product respectively during the multiplication operation, said low-order end of said first accumulator register being coupled to said address register;

shift means coupled to said accumulator registers to enter a digit of the final product at the high end of said second accumulator register and to shift the contents of said first and second registers by one digit position whereby the digit shifting ut the low-order end of said first accumulator registers enters the high-order end of said second register;

an adder means having first and second terminals; means connecting said first terminal to said second accumulator register;

logic means connecting said memory to said second terminal;

decoder and storage means coupled to said low-order end of said first accumulator register and being operative to generate first and second output signals respectively when the sum of said multiplier digit and carry generated by a previous digit has a value less than or equal to 5 and when the sum of said multiplier digit and previous carry has a value greater than 5; and, microprogramming control means coupled to said addressable memory and to said accumulator registers and being operative during the processing of each multiplier digit to condition said first register to apply successive digits as an address to said address register for selecting each multiple in accordance with the sum of said multiplier digit and carry when generated by a previous multiplier digit and to condition said logic means to transfer said multiple directly or complemented in accordance with said first and second output signals for addition to contents of said second accumulator register.

13. An electronic calculator comprising:

an addressable memory storage means including a plurality of register locations for storing a chosen number of different multiples of a multiplicand, said number exclusive of zero being equal to half of the total number of multiplier digit symbols employed by said calculator;

an adder for adding each received signal representation of each selected multiple to a partial accumulated sum;

logic gating means coupled to said memory means and to said adder for directly transferring each said signal representation of said multiple a multiplicand received from said storage means to said adder;

logic translation means coupled to said memory means and to said adder for transferring a complement signal representation of said multiple received from said storage means to said adder; and decoder means being operative in response to each successive multiplier digit received to selectively condition said logic gating means and said translation means to generate all of said multiples required by the total number of digit symbols through either a direct transfer or a complementing of a prestored multiple selected in accordance with the value of each successive multiplier digit.

* * * * *

UNITED STATES PATENT OFFICE
CERTIFICATE OF CORRECTION

Patent No. 3,641,331 Dated February 8, 1972

Inventor(s) Leonard L. Kreidermacher, et al

It is certified that error appears in the above-identified patent and that said Letters Patent are hereby corrected as shown below:

Column 13, line 34, "from" should read -- form -- .
Column 14, line 19, "ut" should read -- out -- .

Signed and sealed this 31st day of October 1972.

(SEAL)
Attest:

EDWARD M.FLETCHER,JR.
Attesting Officer

Robert Gottschalk
Commissioner of Patents